July 2, 1968  W. P. DOE  3,390,483
SIMULATING SOUNDING TOY

Filed Feb. 28, 1966  2 Sheets-Sheet 1

INVENTOR.
WALTER P. DOE
BY
*Cumpston & Shaw*
HIS ATTORNEYS.

July 2, 1968  W. P. DOE  3,390,483
SIMULATING SOUNDING TOY
Filed Feb. 28, 1966  2 Sheets-Sheet 2
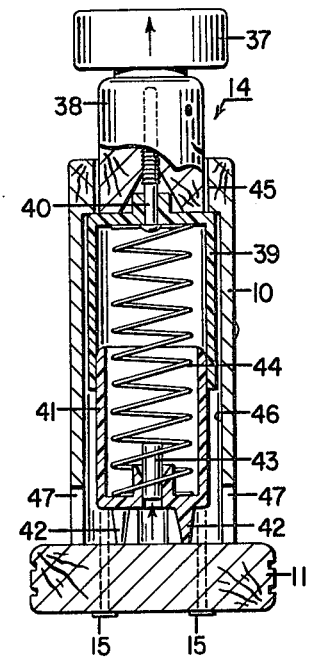
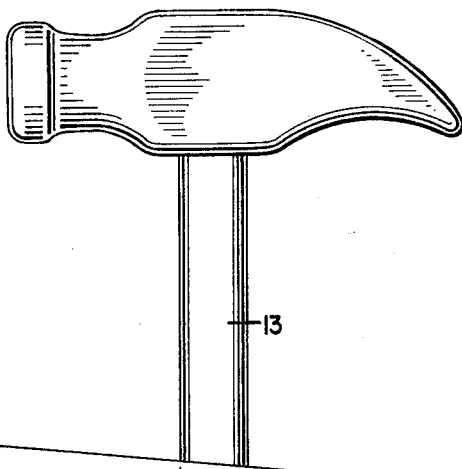
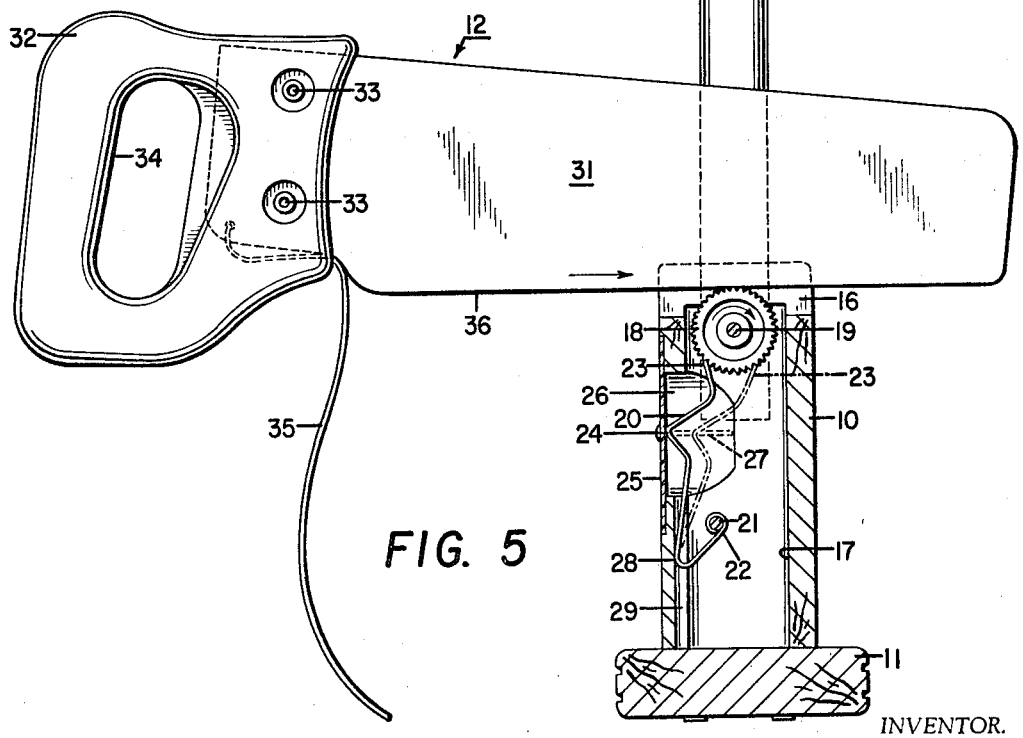
INVENTOR.
WALTER P. DOE
BY
Cumpston + Shaw
HIS ATTORNEYS.

United States Patent Office 3,390,483
Patented July 2, 1968

3,390,483
SIMULATING SOUNDING TOY
Walter P. Doe, East Aurora, N.Y., assignor to Fisher-Price Toys, Inc., East Aurora, N.Y., a corporation of New York
Filed Feb. 28, 1966, Ser. No. 530,603
13 Claims. (Cl. 46—177)

This invention relates to a toy that is bisonant in the sense that it produces two distinguishable and alternate sounds when stroked in a reciprocating motion with an actuator. In a preferred embodiment, the inventive toy is made for simulating the motion and sound of a handsaw at work.

The objects of the invention include, but are not limited to, the following:

(a) entertaining and educating children by providing a subject for play action and by producing sounds;

(b) a toy that is simple, rugged, durable, economical, and yet entertaining and educational for children; and (c) a toy affording children an opportunity to experiment and practice with motion and sound, and to imitate activities of grown-ups, and which is safe for children to use without injury to themselves or things in their environment.

These and other objects of the invention will be apparent hereinafter from the specification, which describes the invention, its use, operation, and preferred embodiment, from the drawings, which constitute a part of the disclosure, and from the subject matter claimed.

Generally, the objects of the invention are accomplished by an actuator that can be moved by a child in a reciprocating motion within a groove to rotate in alternate directions a toothed wheel recessed in the groove so as to vibrate a resilient member engaging the wheel for producing two distinguishable and alternate sounds. In a preferred embodiment, the actuator simulates a handsaw, and the two sounds simulate the fore and back stroke noises of a handsaw at work. The preferred embodiment also includes a hammer and a poundable member that moves and makes sounds.

In the drawings:

FIG. 4 is a section of the body of FIG. 2 along the line 4—4; and

FIG. 5 shows a section of the body of FIG. 2 along the line 5—5 with the addition of the saw in position for action, and the hammer in stored position, and with the omission of the pounding nail.

Figure 1:
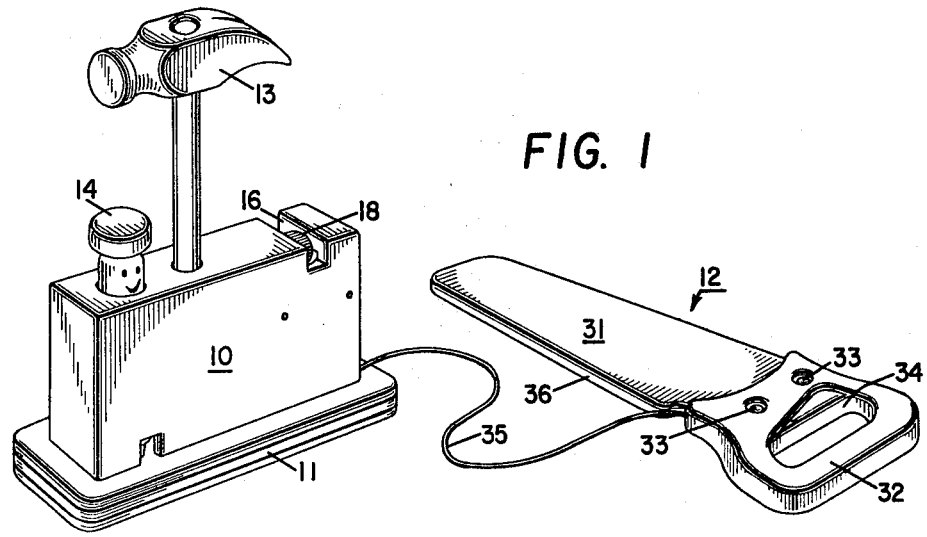
FIG. 1 is a perspective view of a preferred embodiment of the inventive toy including a body, pounding nail, hammer, and saw.

The preferred embodiment of the inventive toy as illustrated in the drawings includes a body 10, a base 11, a saw 12, a hammer 13, and a pounding nail 14. The structure of such elements will be described, and then the operation of the toy will be explained. Each identified element is marked with the same reference number in each figure in which it occurs.

BODY AND BASE

Body 10 is preferably formed as a block of wood, plastic, or other strong and durable material, and is secured to base 11 in a generally upright position as illustrated. Several known fastening means can be used to secure body 10 to base 11, and in the preferred embodiment, nails 15 (FIGS. 2, 3, and 4) are used. Body 10 and base 11 are preferably brightly colored and decorated in a workbench motiff.

A groove or notch 16 is formed across the upper surface of body 10, preferably near one end thereof. A counterbore 17 extends from the bottom of body 10 up into communication with notch 16. A toothed wheel 18 is mounted in counterbore 17 so as to extend into notch 16. Wheel 18 is freely rotatable on axial nail 19 driven into the end of body 10 and through counterbore 17. The periphery of wheel 18 is disposed below the upper surface of body 10 and extends above the bottom of notch 16.

A resilient leaf spring 20 is also mounted in counterbore 17, preferably on nail 21 driven through counterbore 17 from one end of body 10. A fixed end 22 of spring 20 is wrapped around nail 21, and a free end 23 engages toothed wheel 18 as best shown in FIG. 5. An intermediate portion 24 of spring 20 is bent to form a projection selectively engaging diaphragm 25 which is secured to one face of body 10 in communication with counterbore 17. A curved portion 28 of spring 20 near fixed end 22 rests in groove 29 formed in the side wall of counterbore 17 to act as a pivot point for spring 20.

Diaphragm 25 is preferably a disk of paper, plastic, or other sounding material secured over a lateral bore 26 communicating with counterbore 17. In the illustrated embodiment, nails 27 secure diaphragm 25 in place, but, of course, other fasteners could be used.

Body 10 also preferably includes a recess 30 for receiving the handle of hammer 13 for storage. Other details of body 10 will be described in connection with pounding nail 14.

SAW

Figure 2:
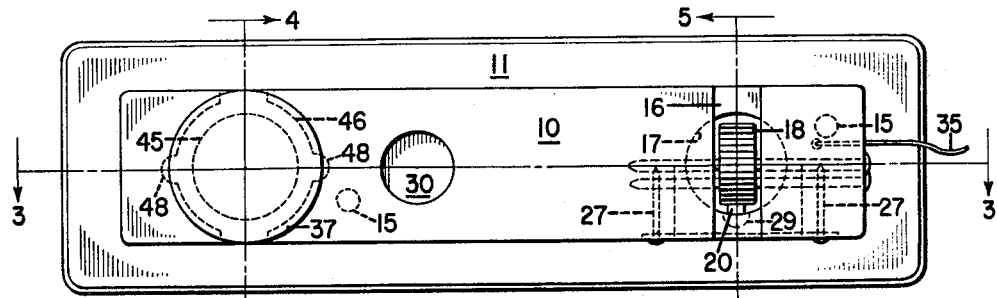
FIG. 2 shows a plan view of the body of the toy of FIG. 1 with the hammer and saw not illustrated.

Saw 12 includes a blade 31 and a handle 32 secured to the blade with rivets 33. Of course, the saw could be formed as an integral unit or other fasteners could be used to secure its blade and handle together. Handle 32 is preferably formed of plastic or wood and formed with a recess 34 sized to fit the fingers of a small child for a hand grip on handle 32. A cord 35 is secured to saw 12, preferably by being pinched between handle 32 and blade 31. The body end of cord 35 is preferably pinched between body 10 and base 11, as shown in FIG. 2, for connecting saw 12 to body 10. Cord 35 is preferably formed of plastic or string and keeps saw 12 within reach of body 10.

The lower edge 36 of blade 31, where the cutting teeth of a normal handsaw would be located, is preferably formed straight and toothless as illustrated. Also, blade 31 is preferably formed of wood or plastic, so that edge 36 is flat and blunt and cannot be used for cutting or marring furniture, and cannot injure a child using the saw.

POUNDING NAIL

Figure 3:
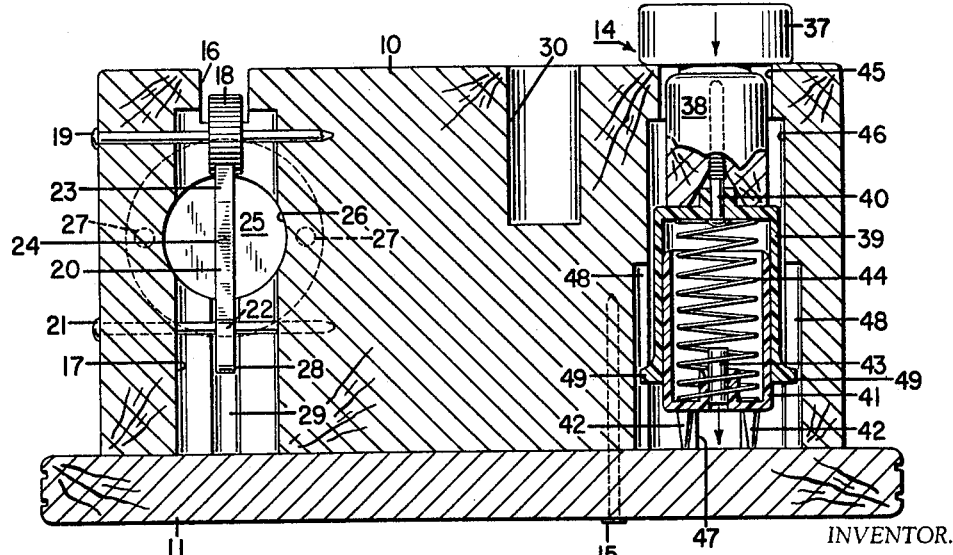
FIG. 3 is a section of the body of FIG. 2 along the line 3—3.

Pounding nail 14, as best illustrated in FIGS. 3 and 4, includes a pounding head 37 and a shank 38 preferably formed of wood or plastic. Shank 38 is preferably decorated with facial features as best shown in FIGS. 1 and 4. A socket 39 preferably formed of plastic is secured to the bottom of shank 38 by nail 40 and opens downward. Of course, head 37, shank 38, and socket 39 could be formed in a single piece.

Hollow member 41 is positioned below and inside of socket 39 and is spaced above base 11 by legs 42. A pneumatically actuated sounding mechanism 43 is fitted within an aperture in the botom of member 41 and also spaced above base 11. The outside diameter of member 41 is slightly less than the inside diameter of socket 39 for a running fit within the socket. Compression coil spring 44 is disposed inside socket 39 and hollow member 41 for urging these two elements apart.

Shank 38 of nail 14 extends upward above the upper surface of body 10 through aperture 45. A counterbore 46 extends from the bottom of body 10 into communication with aperture 45 and generally houses socket 39 and hollow member 41. Socket 39 preferably has an outside diameter greater than the inside diameter of recess 45 so as to stop against the top of counterbore 46. Opening 47 in the side walls of body 10 communicate with counterbore 46 to provide air passageways for pneumatic sounder 43. Grooves 48 are formed along opposite sides of counterbore 46 to accommodate projections 49 extending outward from the bottom of socket 39. The engagement of projections 49 against the upper ends of grooves 48 augments the limit stop for the upward motion of nail 14.

OPERATION

The simulated handsaw 12 is grasped by a child by its handle 32, and the lower edge 36 of blade 31 is placed in groove 16 on toothed wheel 18. The saw is then drawn back and forth in a reciprocating motion simulating that of a real handsaw, and such motion rotates wheel 18 alternately in one direction and the opposite direction.

As shown in FIG. 5, when saw 12 is moved in the direction of the arrow, it rotates wheel 18 in the direction of rotation indicated by its arrow. Such rotation positions spring 20 in its illustrated solid-line position in which spring projection 24 engages diaphragm 25. The vibration of free end 23 of spring 20 against the teeth of wheel 18 during such rotation is thus transmitted to diaphragm 25 for making a relatively loud vibrational sound.

A right-handed child will tend to work from the side of body 10 illustrated in FIG. 1 so that notch 16 is toward the righthand edge of body 10. In such orientation, the saw motion illustrated in FIG. 5 corresponds to the forestroke of a handsaw. With cross-cut or ripping teeth as normally arranged on a real handsaw, the forestroke is the cutting stroke and produces the most noise; this result is simulated in the preferred embodiment of the inventive toy, in which the forestroke illustrated in FIG. 5 also produces the loudest noise.

Backstroke motion of saw 12 rotates wheel 18 in a direction opposite to its arrow in FIG. 5. This moves the free end 23 of spring 20 to its broken-line position in which projection 24 is clear of diaphragm 25. Vibration of free end 23 against the teeth of wheel 18 from such rotation produces sound which is not amplified by diaphragm 25. Hence, the backstroke noise of the inventive toy is not so loud and is of a different quality from the forestroke noise, making the toy bisonant.

Of course, saw 12 can be oriented in the opposite direction in groove 16 from that illustrated in FIG. 5, or the saw can be used in any other way that strikes the fancy of a child. The toothless, blunt edge 36 makes saw 12 relatively harmless for a child to play with.

Hammer 13, or a fist, or another object can be used for pounding on nail 14. As indicated by the arrow on head 37 in FIG. 4, nail 14 is in its normal, uppermost position with the face on shank 38 showing above the upper surface of body 10. In such position, compression spring 44 has urged socket 39 and hollow member 41 as far apart as possible, and projections 49 are resting against the top of grooves 48 and the upper surface of socket 39 is resting against the top of counterbore 46 to limit the upper motion of nail 14.

As indicated by the arrow on head 37 in FIG. 3, nail 14 has been driven to its lowermost position, with head 37 engaging the upper surface of body 10. In this position, compression spring 44 is fully compressed, and socket 39 is driven down over hollow member 41. Upon release from this position, spring 44 will drive socket 39, shank 38, and head 37 upward to the position illustrated in FIG. 4 so that nail 14 pops up after each blow.

A blow forcing nail 14 down to the position illustrated in FIG. 3 compresses air inside socket 39 and hollow member 41 and exhausts air through sounding mechanism 43 as indicated by the arrows. Slots 47 above base 11 allow air to be exhausted outside of body 10. Movement of nail 14 back to its normal position illustrated in FIG. 4 reduces the air pressure inside hollow member 41 and socket 39 and draws air upward through sounding mechanism 43 as indicated by the arrow. Movement of air through sounding mechanism 43 is utilized in at least one direction to make a sound preferably in the form of a whistle or a squeak. Sounding mechanism 43 is preferably oriented to make a sound on the upstroke of nail 14, partly because the downstroke is accompanied by a banging noise as hammer 13 or another object hits the head 37 of nail 14. Thus, nail 14 is driven down with a banging blow, and pops back up in a motion accompanied by a squeak or a whistle sound.

Thus, the invention accomplishes its objects in providing the child with a manipulatable toy simulating adult use of a handsaw in both sound and motion, and providing a satisfying pop-up nail to be struck with a toy hammer to make associated bang and squeak noises. The toy is simple and rugged enough to withstand aggressive pounding and sawing and is attractively decorated and colored to please a child. Children at play with the inventive toy can experiment with motions, can learn to coordinate their muscles for accurate striking of the nail and drawing of the saw back and forth in notch 16, and can accompany such satisfying occupations with pleasant noises.

From the described operation and from the subject matter claimed, it is clear that a variety of shapes, sizes, mounting arrangements, recesses, grooves, counterbores, fasteners, etc. are possible within the spirit of the invention. Also, other features, advantages, and other specific embodiments of this invention will be apparent to those exercising ordinary skill in the pertinent art, after considering the foregoing disclosure. In this regard, while specific preferred embodiments of my invention have been described in considerable detail, such disclosure is intended as illustrative, rather than limiting, and other embodiments, variations, and modifications can be effected within the spirit and scope of the invention as disclosed and claimed.

I claim:
1. A toy comprising:
  (a) a body;
  (b) a normally upper surface of said body being formed to define a notch extending across said upper surface;
  (c) a toothed wheel mounted for rotation in said notch, the periphery of said wheel being below said upper surface;
  (d) a resilient member secured to said body and having a free end engaging said wheel, said resilient member being disposed for making one sound upon rotation of said wheel in one direction, and a different sound upon rotation of said wheel in the opposite direction; and
  (e) an actuator having an edge sized to fit loosely within said notch and extending for a length sufficient so that said actuator can be drawn back and forth in said notch in a reciprocating motion to rotate said wheel alternately in said one direction and said opposite direction to make said one sound and said different sound alternately.

2. The toy of claim 1 wherein said body comprises a block, said actuator is configured to simulate a hand saw, said edge is generally linear and comprises the bottom of a simulated blade for said hand saw, and said alternate sounds simulate sounds made by a hand saw.

3. The toy of claim 2 wherein a sounding member is mounted on said block, and said resilient member is disposed relative to said wheel for vibrating said sounding member during rotation of said wheel in said one direction and for not vibrating said sounding member during rotation of said wheel in said opposite direction.

4. The toy of claim 3 wherein said sounding member comprises a diaphragm.

5. The toy of claim 4 wherein said block is formed to define a counter bore communicating with said notch from the bottom of said block, said wheel is mounted in said counter bore and extends into said notch, said resilient member is mounted in said counter bore, and said diaphragm is mounted in communication with said counter bore.

6. The toy of claim 5 wherein said resilient member comprises a leaf spring vibrated against said diaphragm by rotation of said wheel in said one direction and vibrated clear of said diaphragm by rotation of said wheel in said opposite direction.

7. A toy according to claim 6 including a base on which said block is secured in a generally upright position, said counter bore and said notch being formed near one end of said block, and wherein said hand saw includes a handle apertured to form a grip sized for the hand of a small child.

8. A toy according to claim 7 wherein said block is provided with a recess extending downward from said upper surface, and a member to be pounded upon is disposed for vertical movement within said recess.

9. The toy of claim 8 including a toy hammer for pounding on said poundable member.

10. The toy of claim 9 wherein said poundable member comprises a pin and a compression spring biasing said pin upward from said recess so that driving said pin into said recess compresses said spring to make said pin pop up out of said recess after each blow.

11. The toy of claim 10 including a noisemaker actuated by motion of said poundable member, and means for limiting the upward travel of said pin from said recess.

12. The toy of claim 11 wherein the lower end of said poundable member is formed as a downwardly open socket, an open-top hollow member closely fitting within said socket is disposed beneath said poundable member, said compression spring is disposed within said hollow member and said socket for urging said poundable pin and said hollow member apart, means are arranged for spacing the bottom of said hollow member from said base, and said noisemaker comprises a pneumatically actuated sounder disposed in the bottom of said hollow member.

13. The toy of claim 2 wherein said block is provided with a recess extending downwardly from said upper surface, and a member to be pounded upon is disposed for vertical movement within said recess.

References Cited

UNITED STATES PATENTS

| | | | |
|---|---|---|---|
| 2,646,646 | 7/1953 | Glass | 46—1 X |
| 3,064,389 | 11/1962 | Lemelson | 46—192 |

LOUIS G. MANCENE, *Primary Examiner.*

R. F. CUTTING, *Assistant Examiner.*